(12) United States Patent
Dartland (10) Patent No.: US 6,607,208 B2
(45) Date of Patent: Aug. 19, 2003

(54) TOWING DEVICE FOR BICYCLE

(76) Inventor: Chris Dartland, 5078 Mission Blvd., San Diego, CA (US) 92109

( * ) Notice: Subject to any disclaimer, the term of this patent is extended or adjusted under 35 U.S.C. 154(b) by 93 days.

(21) Appl. No.: 09/732,071

(22) Filed: Dec. 7, 2000

(65) Prior Publication Data

US 2002/0070526 A1 Jun. 13, 2002

(51) Int. Cl.[7] .............................................. B62K 13/02
(52) U.S. Cl. ...................................... 280/292; 280/204
(58) Field of Search ................................ 280/204, 292, 280/288.4, 492, 493, 495

(56) References Cited

U.S. PATENT DOCUMENTS

| | | | | |
|---|---|---|---|---|
| 2,629,611 A | * | 2/1953 | Covington | 280/204 |
| 4,037,853 A | * | 7/1977 | Sparks | 280/204 |
| 4,261,592 A | * | 4/1981 | Busseuil | 280/292 |
| 5,215,037 A | * | 6/1993 | Allred | 119/29 |
| 5,401,070 A | * | 3/1995 | LePelley | 294/1.1 |
| 5,531,494 A | * | 7/1996 | Singleton | 294/1.1 |
| 5,749,592 A | * | 5/1998 | Marchetto | 280/292 |
| 5,842,710 A | * | 12/1998 | Couture | 280/204 |
| 6,155,582 A | * | 12/2000 | Bourbeau | 280/204 |
| 6,270,100 B1 | * | 8/2001 | Wunderlich | 280/204 |

* cited by examiner

Primary Examiner—Brian L. Johnson
Assistant Examiner—L. Lum
(74) Attorney, Agent, or Firm—John R. Ross; John R. Ross, III (57) ABSTRACT

A bicycle capable of towing a skateboard rider. A hollow tow pole defining an attachment end and an extended end is attached at the attachment end to a bicycle frame of a bicycle. The first end of a stretchable tow rope is extended inside the hollow tow pole and is attached at or near the attachment end of the hollow tow pole. The second end of the stretchable tow rope is attached to a handle. The handle is positioned at or near the extended end of the hollow tow pole when the stretchable tow rope is in a relaxed or substantially relaxed state and the handle is extended at least two feet beyond the extended end when the stretchable tow rope is in a stretched state. In a preferred embodiment the hollow tow pole is collapsible. In a preferred embodiment, the hollow tow pole is pivotally attached to the bicycle frame. In a preferred embodiment, a stop bar is attached to the top of the hollow tow pole.

18 Claims, 10 Drawing Sheets

TOWING DEVICE FOR BICYCLE

The present invention relates to bicycles and in particular to towing devices for bicycles.

BACKGROUND OF THE INVENTION

The history of the bicycle goes back many years. A crude two-wheeled vehicle propelled by the feet was popular as early as the second half of the 17$^{th}$ century. Extensive developments to the design of the bicycle were made during the 19$^{th}$ century. At the end of the 19$^{th}$ century, the bicycle had become a serious means of transportation. In 1899, the U.S. production of about 1,000,000 bicycles a year was valued at $31,000,000. However, by 1909 the bicycle industry in the U.S. was nearly nonexistent due to the advent of the motorcycle and automobile. Bicycle riding was generally confined to children and to small groups of devotees, such as members of the League of American Wheelmen, organized in 1880 and the Century Road Club Association, organized in 1899.

It was not until the 1960's and 1970's that bicycling once again began to enjoy strong popularity. There are several modern reasons that may have resulted in this strong resurgence. Air pollution, traffic congestion, and the high cost of automobile fuel are all reasons that it makes sense to use a bicycle for transportation. Personal fitness is also a modern trend that is very popular. The bicycle is an outstanding device to use for physical exercise.

As the bicycle has developed and has become firmly established as part of our modern culture, its use has expanded in recent years. For example, in addition to the traditional road bicycle, mountain bikes are now very popular. BMX racing is popular with young teenagers.

Skateboarding

Skateboarding is a form of recreation popular among youths, in which a person rides standing balanced on a small board mounted on wheels. A typical skateboard is about 3 feet long and 9 inches wide. Originally, they were made of wood, but they have also been made of aluminum, fiberglass, and plastic. The wheels usually are made of tough polyurethane plastic. A skateboard may either be stiff or flexible.

The skateboard first appeared in the early 1960s on paved areas along California beaches and become popular with local surfers. For the earliest designs, roller-skate wheels were attached to miniature surfboards. Skateboards were revived in the mid-1970s after the development of the faster and more maneuverable polyurethane wheel. As skateboarding became more popular, skateboard parks were built, providing a variety of slopes and banked surfaces for sudden turns and stunts.

The Use of a Bicycle to Tow

Figure 1:
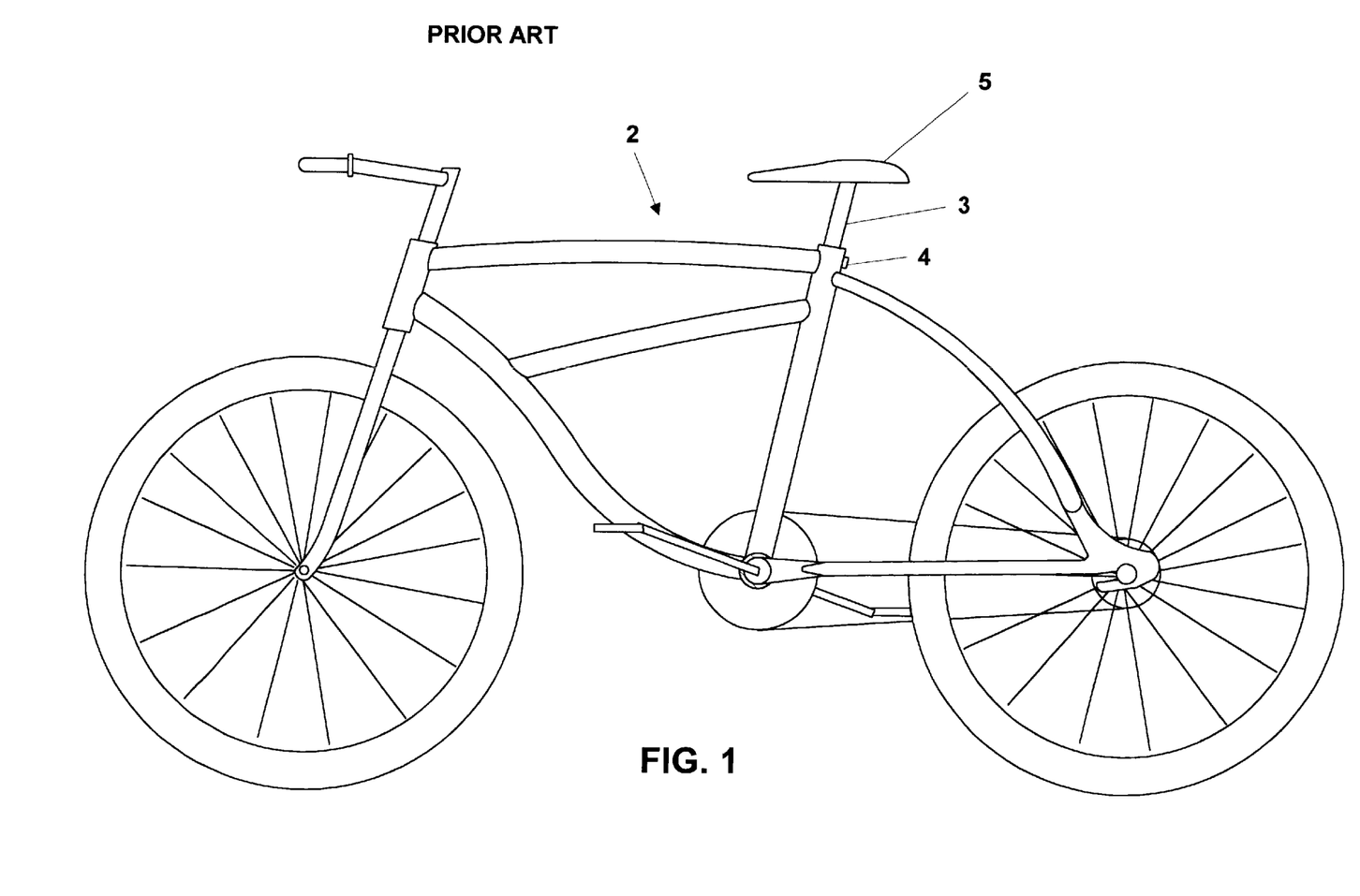
FIG. 1 shows a prior art bicycle.

Shortly after skateboards became popular, it was discovered that a bicycle rider could tow a skateboarder. FIG. 1 shows a prior art bicycle. To be towed a skateboarded would usually mount his skateboard and then hold onto seat 5 while a bicycle rider pedaled the bicycle. This method, however, often resulted in injury to either the skateboarder or the bicycle rider. Because he would hold onto seat 5 with his hands, the skateboarded would ride dangerously close to the wheel and chain of the bicycle. Another prior art method of towing a skateboarder was to tie a rope to seat post 3. Utilizing this method, a skateboarder could ride as far behind the bicycle as the rope permitted. However, this method was also dangerous because as the bicycle rider slowed, the tow rope became slack. It could then easily be tangled in the spokes of the wheel or in the chain of the bicycle, potentially causing serious injury.

What is needed is a better device for towing a skateboarder behind a bicycle.

SUMMARY OF THE INVENTION

The present invention provides a bicycle capable of towing a skateboard rider. A hollow tow pole defining an attachment end and an extended end is attached at the attachment end to a bicycle frame of a bicycle. The first end of a stretchable tow rope is extended inside the hollow tow pole and is attached at or near the attachment end of the hollow tow pole. The second end of the stretchable tow rope is attached to a handle. The handle is positioned at or near the extended end of the hollow tow pole when the stretchable tow rope is in a relaxed or substantially relaxed state and the handle is extended at least two feet beyond the extended end when the stretchable tow rope is in a stretched state. In a preferred embodiment the hollow tow pole is collapsible. In a preferred embodiment, the hollow tow pole is pivotally attached to the bicycle frame. In a preferred embodiment, a stop bar is attached to the top of the hollow tow pole.

DETAILED DESCRIPTION OF THE PREFERRED EMBODIMENTS

Preferred embodiments of the present invention can be described by reference to FIGS. 2–21.

Figure 8:
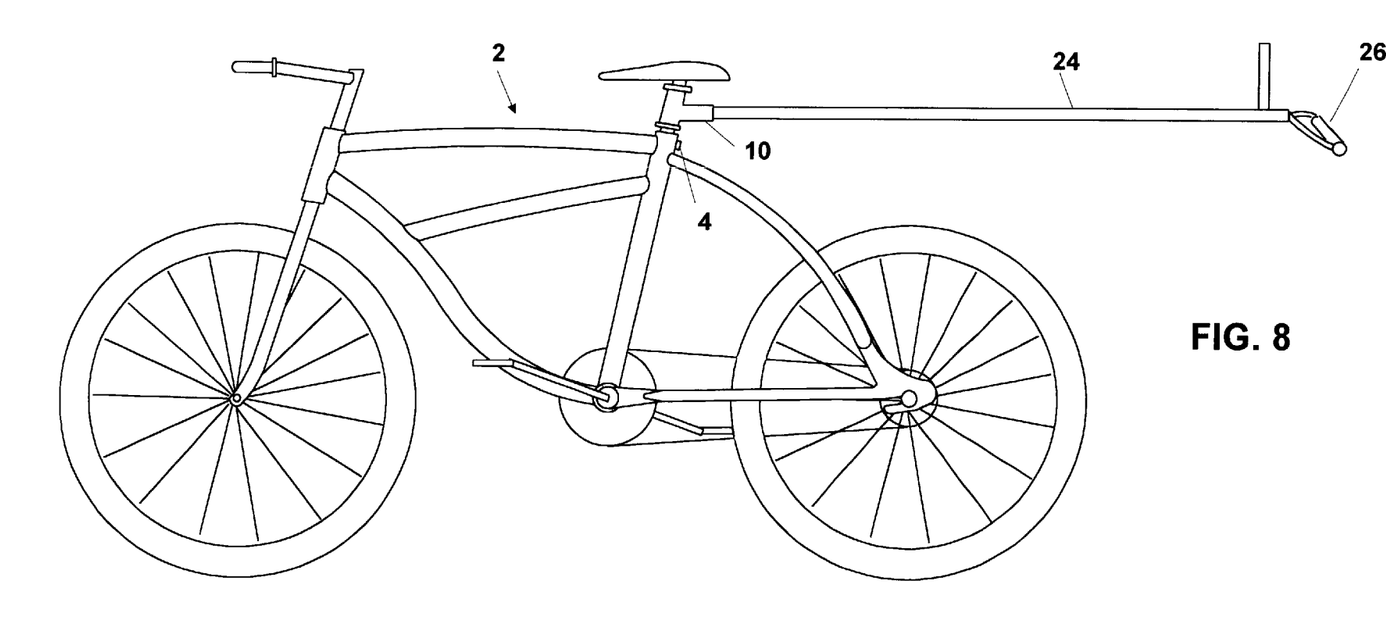
FIG. 8 shows a preferred embodiment of the present invention with a bicycle.
Figure 9:
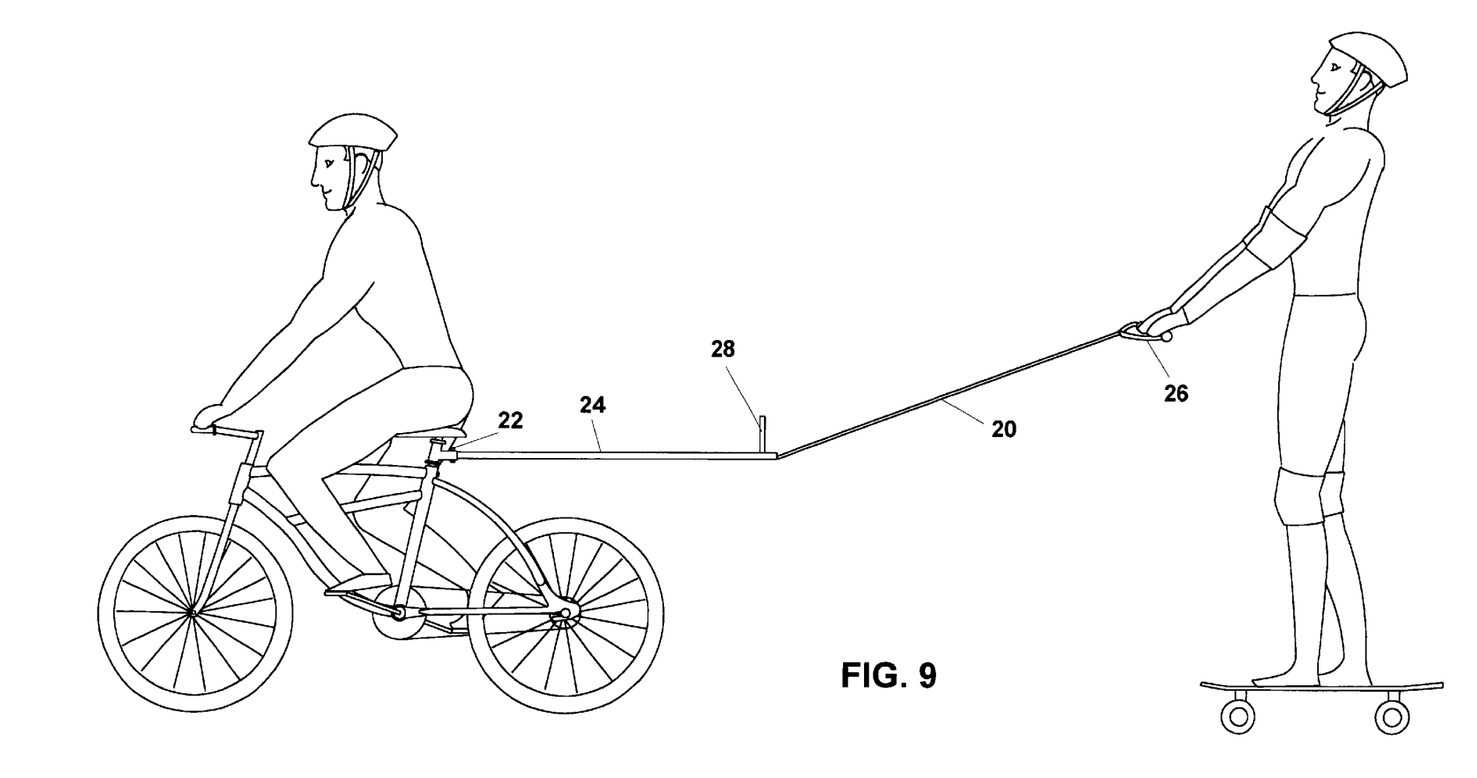
FIG. 9 shows the utilization of a preferred embodiment of the present invention.

FIG. 9 shows a bicycle rider towing a skateboarder while utilizing a preferred embodiment of the present invention. Tow pole 24 is pivotally attached to the bicycle. The skateboarder is standing on his skateboard and is grasping handle 26. Stretchable bungee cord 20 is connected to handle 26 at one end and is inserted inside tow pole 24 and is attached to bolt 22 at its other end. As the skateboarder rides behind the bicycle, bungee cord 20 will stretch so that the skateboarder can maintain a safe distance behind the bicycle. When the bicycle rider slows down or stops the skateboarder will coast in. As he coasts in, the tension on bungee cord 20 will decrease so that when the bicycle has stopped and the skateboarder has let go of handle 26, the present invention will appear as shown in FIG. 8 with handle 26 flush against the back end of tow pole 24. Tow pole 24 keeps bungee cord 20 and handle 26 away from the bicycle wheels and chain.

First Preferred Embodiment

Figures 2A, 2B:
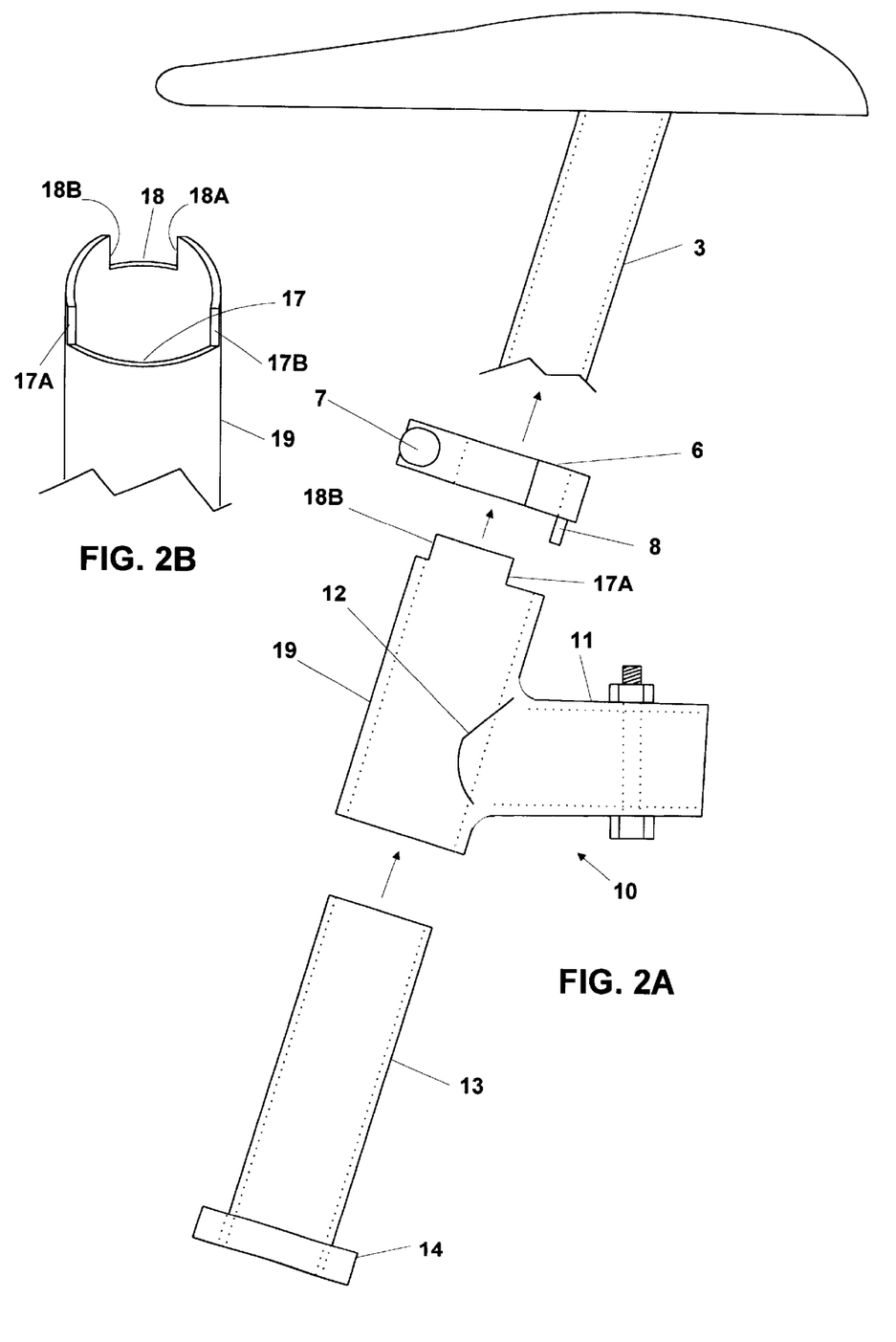
FIGS. 2A and 2B show a preferred embodiment of the present invention.
Figure 4:
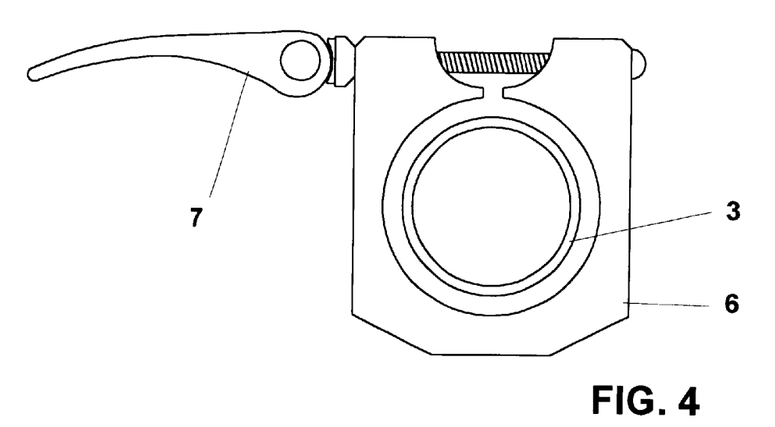
FIGS. 4 and 5 show a quick release lock.

Seat post 3 with seat 5 is removed from bicycle frame 2 after loosening bolt 4 (FIG. 1). After seat post 3 is removed from bicycle 2, clamp 6 is slid over seat post 3, as shown in FIG. 2A. FIG. 4 shows a top view of clamp 6 with quick release lock 7 slid over seat post 3. In a preferred embodiment, clamp 6 is aluminum and has guide tab 8 extending downward, as shown in FIG. 2A. In FIG. 4, quick release lock 7 is in the unlocked position.

Pole support piece 10 is then slid over seat post 3, as shown in FIG. 2A. In a preferred embodiment, pole support piece 10 is metal with hollow extension 11 welded to pivot section 19 at weld 12. A perspective top view of the upper portion of pivot section 19 is shown in FIG. 2B. Pivot section 19 has large cutout section 17 and small cutout section 18.

Figure 3:
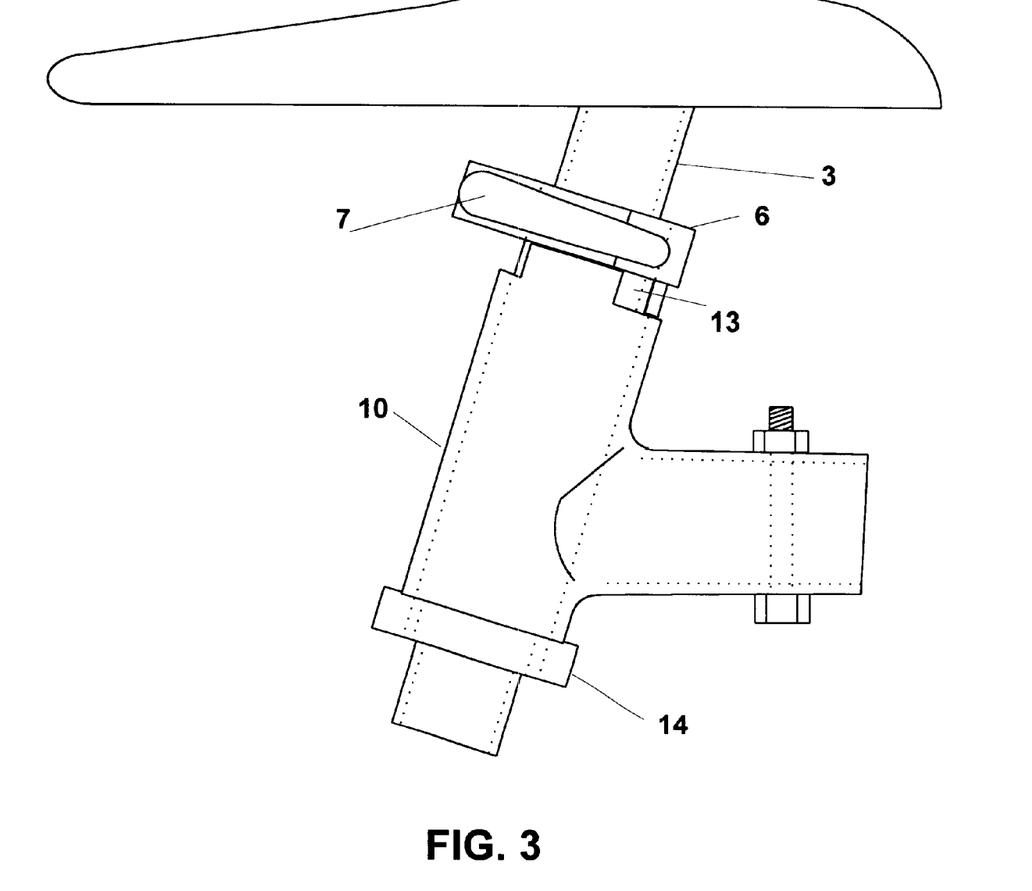
FIG. 3 shows a preferred embodiment of the present invention.
Figure 5:
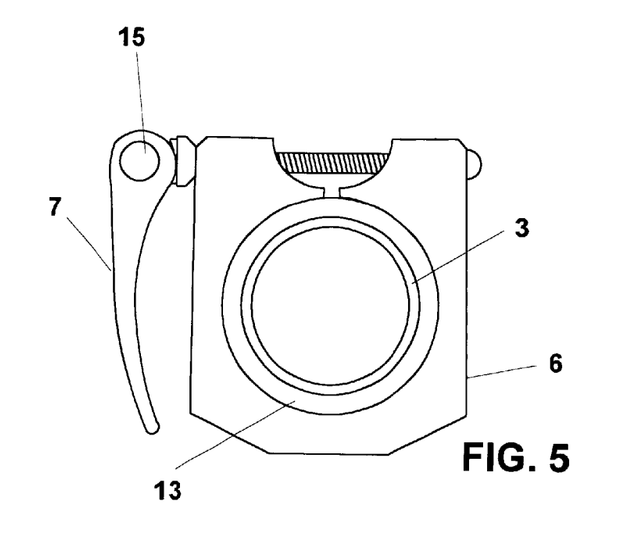

Bearing 13 is slide over seat post 3 and inside of pole support piece 10 and inside of clamp 6 (FIG. 2A). Quick release lock 7 is then locked causing it to tighten clamp 6 onto bearing 13 and seat post 3 so that bearing 13 is held tightly against seat post 3, as shown in FIGS. 3 and 5. Pole support piece 10 is free to rotate on bearing 13 and is prevented from sliding off of bearing 13 by bearing end piece 14 (FIG. 3). In a preferred embodiment, bearing 13 is cut from a PVC pipe. Preferably, the inner diameter of bearing 13 should be such that it can slide over seat post 3 with minimal hand force (FIG. 2). Preferably, bearing end piece 14 is a PVC washer with an inner diameter that is approximately equal to the outer diameter of bearing 13. Bearing end piece 14 is preferably glued to bearing 13.

Figure 6:
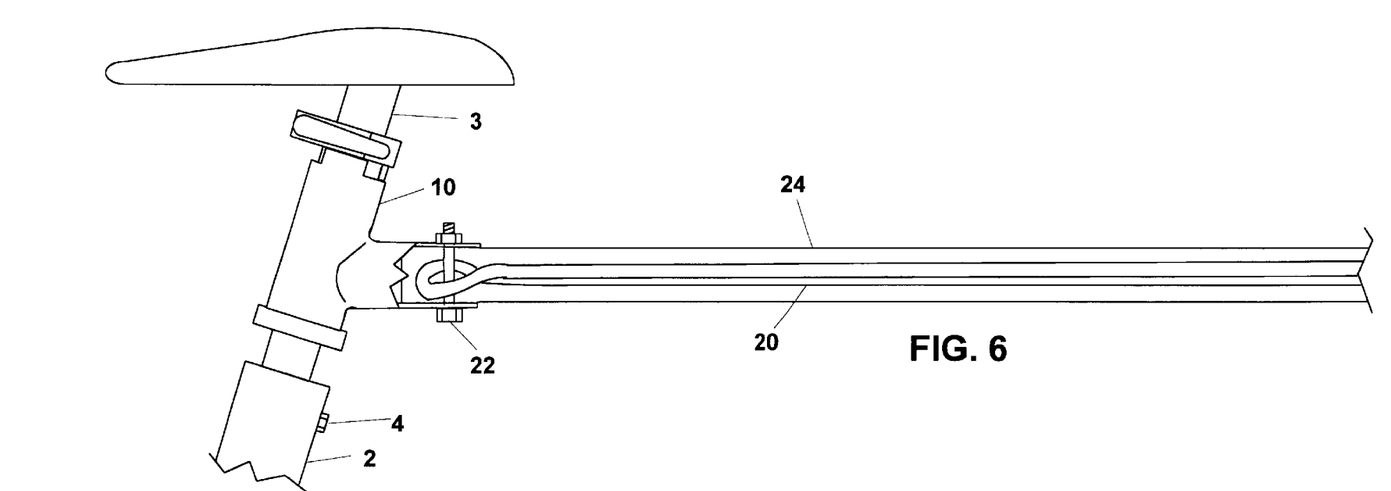
FIGS. 6 and 7 show a preferred embodiment of the present invention.
Figure 7:
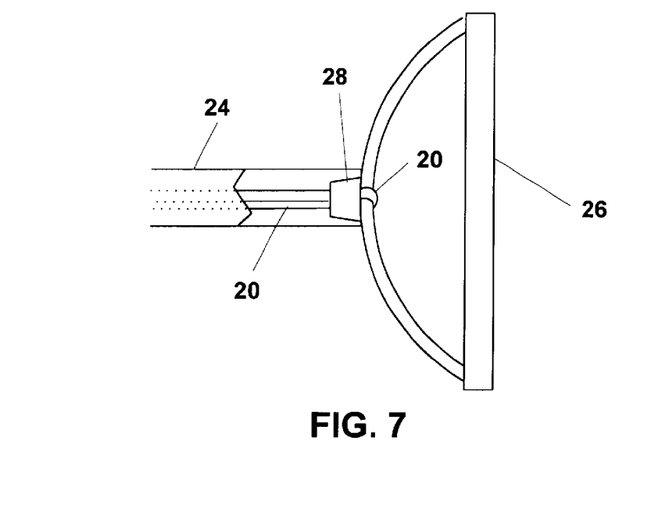

Seat post 3 is then mounted back onto bicycle frame 2 by tightening bolt 4, as shown in FIG. 6. Bungee cord 20 is then inserted inside hollow tow pole 24 and is looped around bolt 22. In a preferred embodiment of the present invention, hollow tow pole is PVC pipe and is approximately four feet long and has an outer diameter of approximately 1¼ inches. A bungee cord is an elasticized cord that is commonly used as a fastening device or as a shock-absorbing device. The opposite end of bungee cord 20 is looped through rubber stopper 28 and is attached to tow handle 26, as shown in FIG. 7. Preferably, bungee cord 20 is slightly stretched so that it is under tension and handle 26 is held flush against hollow tow pole 24, as shown in FIGS. 7 and 8.

FIG. 9 shows an example of a preferred embodiment of the present invention being used to tow a skateboarder. To use the present invention, a skateboard rider first mounts his skateboard and then grabs handle 26. A bicycle rider then begins to pedal his bicycle. As he pedals his bicycle, the bicycle rider will be towing the skateboarder. Because the skateboarder is grasping handle 26, bungee cord 20 will begin to stretch. Bungee cords of varying elasticities are available. In a preferred embodiment of the present invention the length of bungee cord 20 is approximately three feet eight inches long in its unstretched state and approximately ⅜ inch in diameter. It will stretch to a maximum of length of approximately ten feet, depending on the load. For example, by reference to FIG. 9, if tow pole 24 is four feet long, a typical skateboarder could grasp handle 26 and ride behind the bicycle stretching bungee cord 20 so that handle 26 is approximately six feet behind the back end of tow pole 24. When the bicycle rider stops or slows down, the skateboarder will coast into tow pole 24. As he coasts in, the length of bungee cord 20 will decrease so that if the skateboarder coasts all the way in, bungee cord 20 will be all the way inside tow pole 24, as shown in FIG. 8. As shown in FIG. 9, stop bar 28 is mounted to the top of tow pole 24. As he coasts in, the skateboarder can maintain the same speed as the bicycle so that when the bicycle stops the skateboarder can stop with it by gripping stop bar 28.

Pivoting Feature

Figure 10:
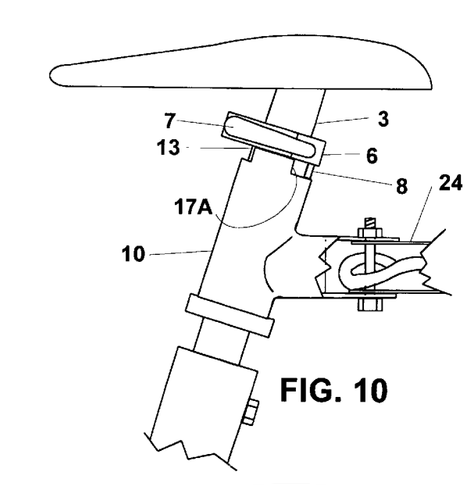
FIGS. 10–12 illustrate the pivoting feature of a preferred embodiment of the present invention.
Figures 11, 12:
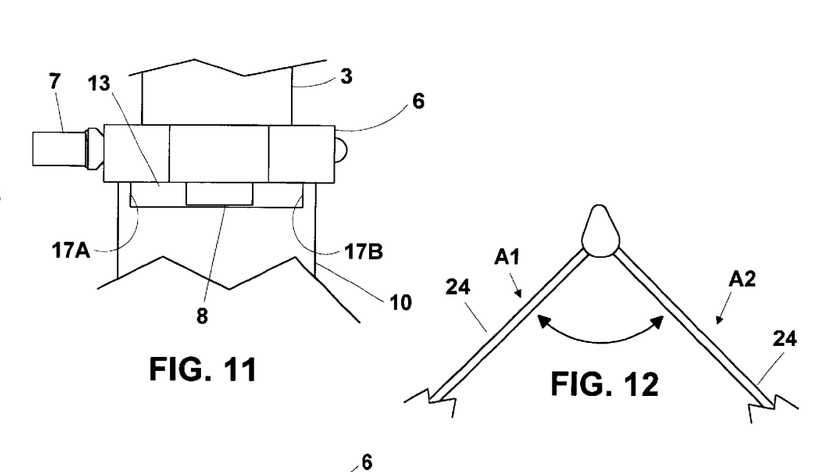
Figure 13:
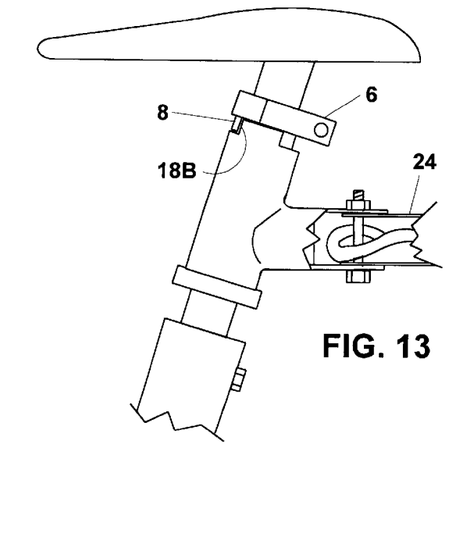
FIGS. 13–15 illustrate the locking feature of a preferred embodiment of the present invention.

FIGS. 10 and 11 show pole support piece 10 mounted to seat post 3. Clamp 6 is held tight against bearing 13 by locking quick release lock 7. In a preferred embodiment, pivot section 19 is approximately 1⅜ inches in diameter (FIG. 2B). The circumferential distance between sides 17A and 17B is approximately 1¾ inches. Pole support piece 10 is free to rotate on bearing 13 until sides 17A and 17B abut guide tab 8. Sides 17A and 17B abutting against tab 8 will prevent pole support piece 10 from fully rotating around bearing 13. As shown in FIG. 12, as tow pole 24 pivots to the right, it will eventually cause guide tab 8 to abut side 17A (FIG. 11). When guide tab 8 is abutted against side 17A, pole 24 is at position A2 (FIG. 12). Likewise, as tow pole 24 pivots to the left, it will eventually cause guide tab 8 to abut side 17B (FIG. 11). When guide tab 8 is abutted against side 17B, pole 24 is at position A1 (FIG. 12). In a preferred embodiment of the present invention, the angle between position A1 and position A2 is approximately ninety degrees.

Locking Feature

Figure 14:
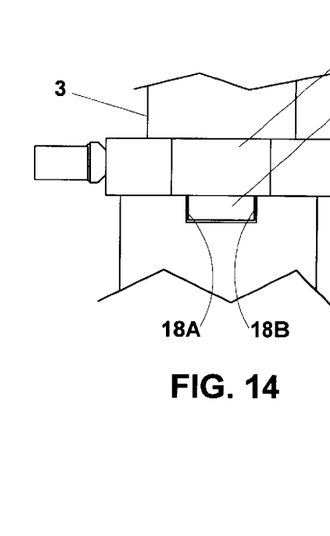
Figure 15:
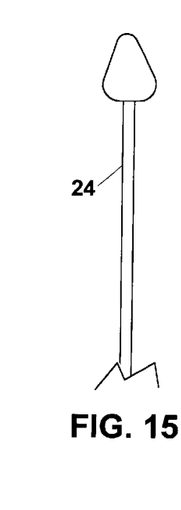

A preferred embodiment of the present invention allows for tow pole 24 to be locked in the position shown in FIG. 15. It is preferable to lock tow pole 24 in the position shown in FIG. 15 when the present invention is not being utilized for towing. By locking tow pole 24 directly behind the bicycle rider, tow pole 24 will not pivot about the axis of seat post 3, and will therefore be of minimal distraction to the bicycle rider. To lock tow pole 24, clamp 6 is loosened by moving quick release lock 7 to the unlocked position (FIG. 4). Then, clamp 6 is rotated 180° from the position shown in FIG. 10 to the position shown in FIG. 13. Quick release lock 7 is then locked (FIG. 5). Tab 8 is then between sides 18A and 18B (FIGS. 2B and 14). Pole support piece 10 is prevented from pivoting about the axis of seat post 3 due to tab 8 abutting sides 18A and 18B.

Second Preferred Embodiment

Figure 16:
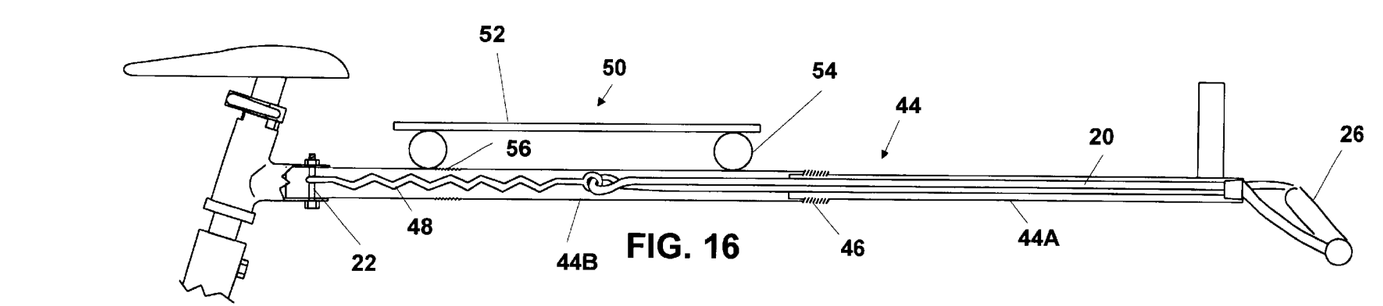
FIGS. 16–18 show another preferred embodiment of the present invention.
Figure 17:
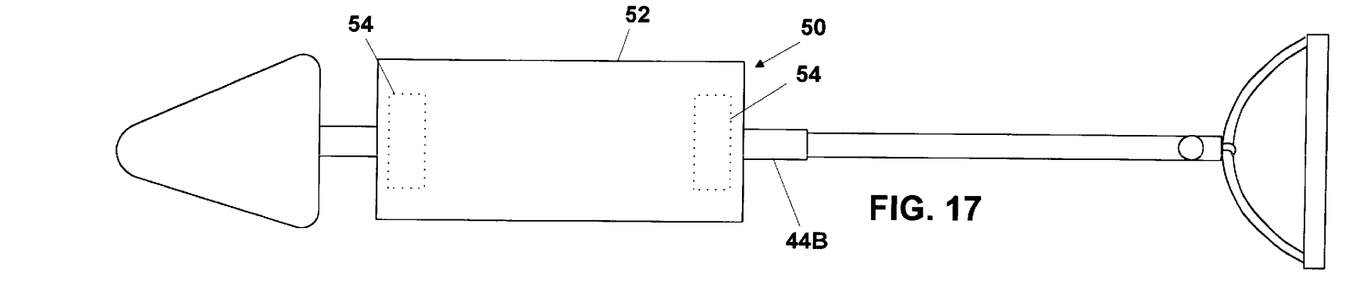
Figure 18:
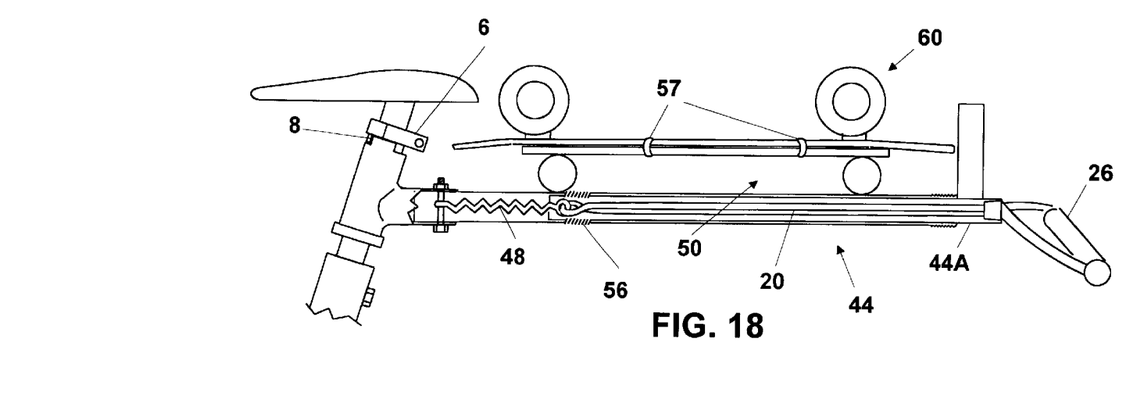

A second preferred embodiment is shown in FIGS. 16–18. Tow pole 44 is split into first section 44A and second section 44B. In a preferred embodiment, first section 44A is slid inside second section 44B and is connected to second section 44B via threads 46. Bungee cord 20 is looped through spring 48. Spring 48 is looped around bolt 22. In a preferred embodiment, spring 48 is a metal coil spring. In the embodiment shown in FIG. 16, spring 48 and bungee cord 20 are both under tension, causing handle 26 to be held flush against first section 44A.

Collapsibility

Another advantage of the second preferred embodiment is that it is collapsible. To collapse tow pole 44, first section 44A is unthreaded from second section 44B at threads 46 and then rethreaded to second section 44B via threads 56, as shown in FIG. 18. Because spring 48 and bungee cord 20 are still under tension in the collapsed position, handle 26 will still be held flush against the back end of first section 44A. Tow pole 44 preferably will be collapsed when it is not being used to tow. In FIG. 18, clamp 6 has been moved so that tab 8 is preventing pivoting of tow pole 44, as explained above.

Rack

In the second preferred embodiment, rack 50 is mounted to the back of second section 44B, as shown in FIGS. 16 and 17. Second section 44B is preferably aluminum. Hollow tubes 54 are welded to the top of second section 44B. Plate 52 is welded to the top of tubes 54. Objects can then be mounted to the top of rack 50. FIG. 18 shows a side view of skateboard 60 mounted to rack 50 via straps 57.

Third Preferred Embodiment

Figure 19:
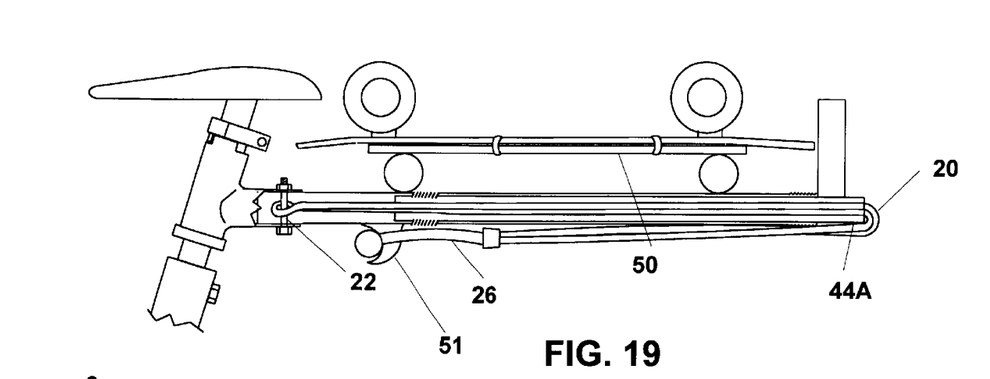
FIG. 19 shows another preferred embodiment of the present invention.

A third preferred embodiment is shown in FIG. 19. The third preferred embodiment is similar to the second preferred embodiment except that spring 48 has been removed and bungee cord 20 is looped directly around bolt 22. In this preferred embodiment, after tow pole 44 has been collapsed, handle 26 is looped over hook 51 so that it does not dangle from the back end of first section 44A. In this embodiment, bungee cord 20 can be made longer than it was in the second embodiment.

Fourth Preferred Embodiment

Figure 20:
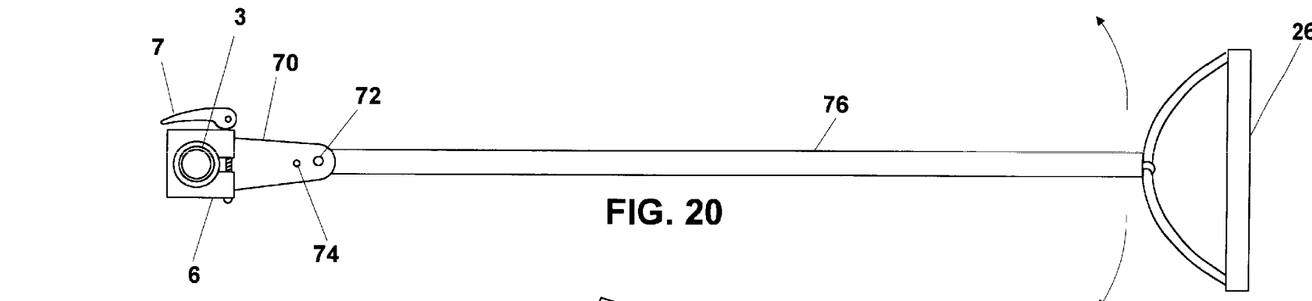
FIGS. 20–21 show another preferred embodiment of the present invention.
Figure 21:
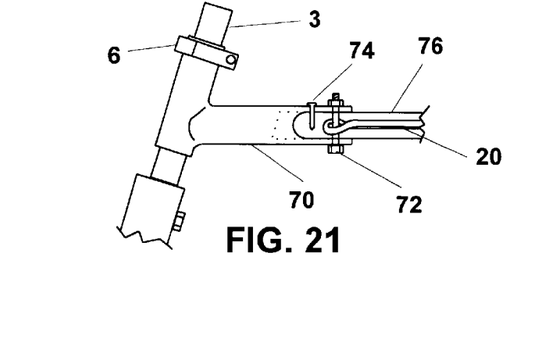

A fourth preferred embodiment is shown in FIGS. 20 and 21. Clamp 6 tightens pole support piece 70 against seat post 3 by moving quick release lock 7 to the locked position. In the fourth preferred embodiment, pole support piece 70 is rigidly attached to seat post 3 so that it does not pivot about seat post 3. Tow pole 76 is pivotally connected to tow support piece 70 via bolt 72 and is free to pivot about bolt 72 in the direction indicated by the arrows in FIG. 20. Removable pin 74 may be inserted to lock tow pole 76 in the position shown in FIG. 20. Bungee cord 20 is looped around bolt 72 and is under tension so that handle 26 is held flush against tow pole 76 when the fourth preferred embodiment is not in use.

Although the above-preferred embodiments have been described with specificity, persons skilled in this art will recognize that many changes to the specific embodiments disclosed above could be made without departing from the spirit of the invention. For example, although the above preferred embodiments discuss utilizing the present invention for towing a skateboarder, it could also be used to tow other types of riders. Some other riders that could be towed utilizing the present invention are a roller skater or an inline skater. Also, although the above preferred embodiments showed the utilization of bungee cord 20, other types of stretchable tow ropes could be used as well. For example, bungee cord 20 could be replaced with a metal coil spring. Also, although the above preferred embodiments disclosed utilization of the present invention with bicycles, one of ordinary skill in the art would recognize that the present invention could be attached to a motorcycle frame as well. Also, although FIGS. 20 and 21 showed pole support piece 70 clamped via clamp 6 to seat post 3, pole support piece 70 could be rigidly attached to seat post 3 utilizing other methods. For example, pole support piece 70 could be bolted to seat post 3. Also, although a preferred diameter was given above for bearing 13, one of ordinary skill in the art would recognize that bearings of various inside and outside diameters could be utilized to accommodate varying seat post diameters. Also, although it was stated that bearing end piece 14 is preferably glued to bearing 13, both could be molded from a single piece of plastic. Also, one of ordinary skill in the art would recognize that bungee cord 20 could be inserted through a protective metal thimble to prevent wear and chafing of the bungee cord by bolt 22. Also, although it was stated that hollow tow pole 24 is made from PVC pipe, it could also be made from other plastics or metal. Also, bearing 13 could be made from other materials besides PVC, such as other plastics. Therefore, the attached claims and their legal equivalents should determine the scope of the invention.

I claim:

1. A bicycle capable of towing a skateboard rider, comprising:
   A) a bicycle having a bicycle frame,
   B) a hollow tow pole defining an attachment end and an extended end, wherein said hollow tow pole is attached at said attachment end to said bicycle frame,
   C) a stretchable tow rope defining a first end and a second end, and extending through said hollow tow pole said stretchable tow rope being attached at said first end at or near said attachment end of said hollow tow pole,
   D) a handle, attached at said second end of said stretchable tow rope, wherein said handle is positioned at or near said extended end of said hollow tow pole when said stretchable tow rope is in a relaxed or substantially relaxed state and said handle is extended at least two feet beyond said extended end when said stretchable tow rope is in a stretched state, and
   E) a tow pole support piece pivotally attached to said bicycle frame, wherein said hollow tow pole is attached to said tow pole support piece, wherein said pivotally attached tow pole support piece is capable of being locked in a locked position, wherein said hollow tow pole will not pivot when said pivotally attached tow pole support piece is in said locked position.

2. The bicycle as in claim 1, further comprising a bolt attached to said tow pole support piece, wherein said first end of said stretchable tow rope is looped around said bolt to prevent said first end from exiting said hollow tow pole.

3. The bicycle as in claim 1, wherein said hollow tow pole is collapsible.

4. The bicycle as in claim 1, wherein said stretchable tow rope is a bungee cord.

5. The bicycle as in claim 1, wherein said stretchable tow rope comprises a spring.

6. The bicycle as in claim 1, wherein said stretchable tow rope comprises:
   A) a bungee cord, and
   B) a spring connected to said bungee cord.

7. The bicycle as in claim 1, further comprising a rack mounted to said hollow tow pole.

8. The bicycle as in claim 1, further comprising a stop bar mounted to said hollow tow pole.

9. A bicycle capable of towing a skateboard rider, comprising:
   A) a bicycle having a bicycle frame,
   B) a hollow tow pole means defining an attachment end and an extended end, wherein said hollow tow pole is attached at said attachment end to said bicycle frame,
   C) a stretchable tow rope means defining a first end and a second end, and extending through said hollow tow pole means, said stretchable tow rope means being attached at said first end at or near said attachment end of said hollow tow pole means, D) a handle means, attached at said second end of said stretchable tow rope means, wherein said handle means is positioned at or near said extended end of said hollow tow pole means when said stretchable tow rope means is in a relaxed or substantially relaxed state and said handle means is extended at least two feet beyond said extended end when said stretchable tow rope means is in a stretched state, and E) a tow pole support means pivotally attached to said bicycle frame, wherein said hollow tow pole means is attached to said tow pole support means, wherein said pivotally attached tow pole support means is capable of being locked in a locked position, wherein said hollow tow pole means will not pivot when said pivotally attached tow pole support means is in said locked position.

10. The bicycle as in claim 9, further comprising a bolt means attached to said tow pole support means, wherein said first end of said stretchable tow rope means is looped around said bolt means to prevent said first end from exiting said hollow tow pole means.

11. The bicycle as in claim 9, wherein said hollow tow pole means is collapsible.

12. The bicycle as in claim 9, wherein said stretchable tow rope means is a bungee cord.

13. The bicycle as in claim 9, wherein said stretchable tow rope means comprises a spring.

14. The bicycle as in claim 9, wherein said stretchable tow rope means comprises:

A) a bungee cord, and

B) a spring connected to said bungee cord.

15. The bicycle as in claim 9, further comprising a bicycle rack means mounted to said hollow tow pole means.

16. The bicycle as in claim 9, further comprising a stop bar means mounted to said hollow tow pole means.

17. A bicycle capable of towing a skateboard rider, comprising:

A) a bicycle having a bicycle frame,

B) a hollow tow pole defining an attachment end and an extended end, wherein said hollow tow pole is attached at said attachment end to said bicycle frame, C) a stretchable tow rope defining a first end and a second end, and extending through said hollow tow pole said stretchable tow rope being attached at said first end at or near said attachment end of said hollow tow pole, D) a handle, attached at said second end of said stretchable tow rope, wherein said handle is positioned at or near said extended end of said hollow tow pole when said stretchable tow rope is in a relaxed or substantially relaxed state and said handle is extended at least two feet beyond said extended end when said stretchable tow rope is in a stretched state, and E) a tow pole support piece rigidly attached to said bicycle frame, wherein said hollow tow pole is pivotally attached to said tow pole support piece, F) a tow pole support piece locking device, wherein said pivotally attached hollow tow pole will not pivot when said tow pole support piece locking device is engaged with said pivotally attached hollow tow pole.

18. A bicycle capable of towing a skateboard rider, comprising:

A) a bicycle having a bicycle frame,

B) a hollow tow pole means defining an attachment end and an extended end, wherein said hollow tow pole is attached at said attachment end to said bicycle frame, C) a stretchable tow rope means defining a first end and a second end, and extending through said hollow tow pole means, said stretchable tow rope means being attached at said first end at or near said attachment end of said hollow tow pole means, D) a handle means, attached at said second end of said stretchable tow rope means, wherein said handle means is positioned at or near said extended end of said hollow tow pole means when said stretchable tow rope means is in a relaxed or substantially relaxed state and said handle means is extended at least two feet beyond said extended end when said stretchable tow rope means is in a stretched state, E) a tow pole support means rigidly attached to said bicycle frame, wherein said hollow tow pole means is pivotally attached to said tow pole support means, F) a means for locking said pivotally attached hollow tow pole means, wherein said pivotally attached hollow tow pole means will not pivot when said locking means is engaged with said pivotally attached hollow tow pole means.

* * * * *